(12) United States Patent
Geller et al.

(10) Patent No.: US 11,321,733 B2
(45) Date of Patent: May 3, 2022

(54) ANALYZING SECOND PARTY DIGITAL MARKETING DATA

(71) Applicant: PepsiCo, Inc., Purchase, NY (US)

(72) Inventors: Michal Geller, Bronx, NY (US); Eric Higgins, Jersey City, NJ (US)

(73) Assignee: PepsiCo, Inc., Purchase, NY (US)

( * ) Notice: Subject to any disclaimer, the term of this patent is extended or adjusted under 35 U.S.C. 154(b) by 225 days.

(21) Appl. No.: 15/969,384

(22) Filed: May 2, 2018

(65) Prior Publication Data

US 2019/0340640 A1    Nov. 7, 2019

(51) Int. Cl.
*G06Q 30/02*    (2012.01)

(52) U.S. Cl.
CPC ..... *G06Q 30/0243* (2013.01); *G06Q 30/0269* (2013.01)

(58) Field of Classification Search
CPC .......................... G06Q 30/0243; G06Q 30/0269
USPC ........................................ 705/14, 319, 14.42
See application file for complete search history.

(56) References Cited

U.S. PATENT DOCUMENTS

| 9,208,510 B1* | 12/2015 | Bonalle | G06Q 30/02 |
| 9,838,754 B2 | 12/2017 | Goli et al. | |
| 9,846,895 B1* | 12/2017 | Rus | G06Q 30/0275 |
| 9,865,004 B1* | 1/2018 | Snoddy | G06Q 30/0244 |
| 10,216,805 B1* | 2/2019 | Cai | G06F 16/24556 |
| 2008/0103971 A1* | 5/2008 | Lukose | G06Q 20/105 |
| | | | 705/40 |
| 2009/0265220 A1* | 10/2009 | Bayraktar | G06Q 30/0269 |
| | | | 705/14.53 |
| 2010/0211456 A1* | 8/2010 | Reed | G06Q 10/0637 |
| | | | 705/14.43 |
| 2011/0313814 A1* | 12/2011 | Briggs | G06Q 30/02 |
| | | | 705/7.31 |
| 2012/0197718 A1* | 8/2012 | Martchenko | G06Q 30/02 |
| | | | 705/14.53 |
| 2012/0253923 A1* | 10/2012 | Durvasula | G06Q 30/0255 |
| | | | 705/14.43 |
| 2014/0108973 A1* | 4/2014 | Stark | G06F 3/0484 |
| | | | 715/762 |
| 2014/0200988 A1* | 7/2014 | Kassko | G06Q 30/0242 |
| | | | 705/14.41 |
| 2014/0222587 A1* | 8/2014 | Feldman | G06Q 30/0275 |
| | | | 705/14.71 |

(Continued)

OTHER PUBLICATIONS

Development of Display Ads Retrieval System to Match Publisher's Contents (Year: 2017).*

(Continued)

*Primary Examiner* — Gautam Ubale
(74) *Attorney, Agent, or Firm* — Sterne, Kessler, Goldstein & Fox P.L.L.C.

(57) ABSTRACT

Disclosed herein are system, method, and computer program product embodiments for analyzing second party advertising data. An embodiment operates by determining a set of dimensions that a source uses to aggregate data for an advertising campaign. The embodiment creates a subunit advertising campaign based at least in part on the advertising campaign, the determined set of dimensions, and a dimension of interest. The embodiment receives measurement data associated with an execution of the subunit advertising campaign. The embodiment then analyzes the measurement data.

18 Claims, 5 Drawing Sheets

(56) References Cited

U.S. PATENT DOCUMENTS

| | | | | |
|---|---|---|---|---|
| 2014/0250223 | A1* | 9/2014 | Heffernan | H04L 67/22 |
| | | | | 709/224 |
| 2015/0019327 | A1* | 1/2015 | Mazumdar | H04L 43/0876 |
| | | | | 705/14.45 |
| 2016/0034973 | A1* | 2/2016 | Soni | G06Q 30/0269 |
| | | | | 705/14.66 |
| 2016/0210658 | A1* | 7/2016 | Chittilappilly | G06Q 30/0204 |
| 2017/0064411 | A1* | 3/2017 | Goli | H04N 21/812 |
| 2017/0099525 | A1* | 4/2017 | Ray | H04N 21/252 |
| 2018/0053215 | A1 | 2/2018 | e Costa et al. | |
| 2018/0082325 | A1* | 3/2018 | Kitts | G06Q 30/0242 |
| 2018/0096381 | A1* | 4/2018 | Lowenberg | G06Q 30/0246 |
| 2018/0189825 | A1* | 7/2018 | Lin | G06Q 30/0246 |
| 2019/0244243 | A1* | 8/2019 | Goldberg | H04L 9/0637 |
| 2021/0082563 | A1* | 3/2021 | Wingfield | G16H 50/30 |

OTHER PUBLICATIONS

Your Interests According to Google—A Profile-Centered Analysis for Obfuscation of Online Tracking Profiles (Year: 2016).*
An_Artificial_Intelligence_Enabled_Data_Analytics_Platform_for_Digital_Advertisement (Year: 2019).*
Method and System for Mapping Third Party Advertisement Statistics (Year: 2010).*
A Cloud-Based Solution for Deploying Digital Advertising Bidding and Creative Selection Models Based On First Party Data (Year: 2017).*
Using First-Party Website Identity for Remarketing Attribution (Year: 2017).*
Transmittal of International Search Report and Written Opinion of the International Searching Authority directed to related International Application No. PCT/US19/28285, dated Jul. 9, 2019, 8 pages.

* cited by examiner

ANALYZING SECOND PARTY DIGITAL MARKETING DATA

BACKGROUND

Background

Digital marketing has changed how companies and organizations establish and grow relationships with customers and individuals. Digital marketing involves the creation and execution of advertising campaigns through digital platforms. As part of this process, a digital marketer (or advertiser) may be interested in measuring the success of its digital advertising campaigns. A digital marketer may be interested in tracking a number of user engagements such as page impressions, clicks, website hits, add to carts, and actual purchases. A digital marketer may use this information to determine the efficiency of its advertising campaigns and make better decisions for its campaigns in the future.

Traditionally, a digital marketer uses advertising campaigns to drive potential consumers to their online store. The digital marketer may rely on different types of data to measure the success of its advertising campaigns. For example, a digital marketer may collect data about customer behaviors, actions, or interests directly at its own website. This data is often referred to as first party data because the digital marketer collects the data directly at its own website. Because the digital marketer collects the data directly at its own website, the data often contains very detailed information about its customers.

A digital marketer may also receive data about customer behaviors, actions, or interests from an external source such as a data aggregator. This data is often referred to as third party data. Unlike first party data, third party data may be collected at entities not controlled by the digital marketer such as a third party website. In addition to online data, third party data can also include offline data such as offline traffic and sales. Third party data is often made available to any interested digital marketer. But this third party data often has less information than first party data. For example, third party data often does not have individual customer level data (e.g., detail on website interactions or repeats sales) that may be useful to improving advertising campaign performance. The lack of detailed information in third party data is often due to the data being provided in aggregate form. A digital marketer may not find third party data to be very useful because it does not provide unique insights about its particular customers and because it is widely accessible to its competitors.

More recently, a digital marketer may rely on second party data to measure the success of its digital advertising campaigns. Second party data may be data collected at a source not controlled by the digital marketer but that is made available by the source to the digital marketer. In other words, the digital marketer may receive the second party data directly from the source. For example, the digital marketer may have an arrangement with a source (e.g., Amazon.com®) who is willing to share its customer data directly with the digital marketer. Unlike third party data, second party data is generally not sold to any interested digital marketer. Moreover, second party data often can be more granular than third party data.

A digital marketer may rely on second party data because it may provide several advantages over third party data. First, competitors may not have access to second party data. Second, second party data can be more granular than third party data.

But second party may not provide a digital marketer full visibility into who their customers are. This is due to two reasons. First, a digital marketer may receive incomplete second party data. Second, a digital marketer may receive second party data in aggregate form. Both issues are often due to the source being unable to provide the underlying raw data due to privacy or legal restrictions, or because the source has competitive reasons for not providing the underlying raw data.

Without complete, granular, second party data, a digital marketer may be unable to effectively measure the performance of its advertising campaigns. Thus, a digital marketer needs a way to use second party data to form a larger, more complete picture of its customers. In other words, a digital marketer needs a way to get as close as possible to first party data when is it unavailable or inaccessible to the digital marketer.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
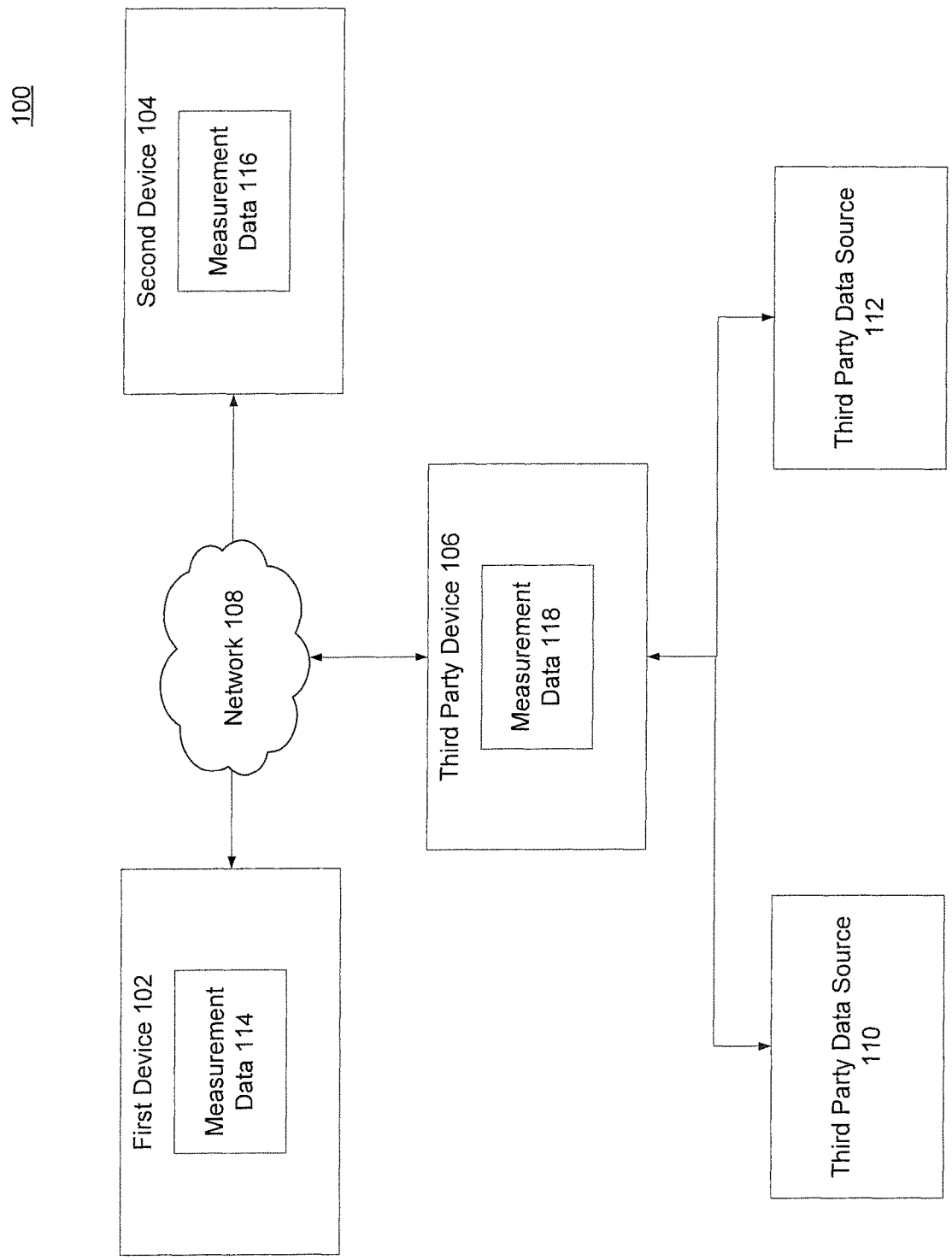
FIG. 1 is a functional block diagram of an example operating environment in which embodiments of the present disclosure can be implemented.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. Overview

Provided herein are system, apparatus, device, method and/or computer program product embodiments, and/or combinations and sub-combinations thereof, for analyzing second party digital marketing data. Specifically, embodiments involve combining second party data with other data (e.g., other second party data or third party data) to approximate first party data. Before describing further details of these embodiments, a brief overview of digital marketing is provided, including what a digital advertising campaign is, how advertisement messages (or "ads") are targeted at users, and how the success of a digital marketing campaign is measured.

1.1 Digital Advertisement Campaigns

At a high-level, marketing involves connecting advertisers with their audiences. This may involve creating and executing various advertising campaigns through a series of ads that share a single idea or theme of a company or organization with an audience. An ad is often referred to as a "creative" since it is often the result of creative inspiration or skill.

In traditional marketing, a creative may be a newspaper advertisement, television commercial, radio advertisement, billboard, or any other type of creative as would be appreciated by a person of ordinary skill in the art. In digital marketing, a creative may be a static creative, flash creative, or rich media creative. A static creative may be an image or graphic that does not move such as a GIF or JPEG. A flash creative may be an image or graphic that is self-animated. A rich media creative may be an image or graphic with which a user can interact. For example, a user may interact with a rich media creative thru a mouse over or mouse click.

1.2 Digital Advertisement Campaign Targeting

An advertiser may want to create an advertising campaign that targets particular users. This is because an advertiser may want to ensure their marketing efforts reach relevant consumers so as to enable efficient advertising spending. An advertiser may target particular users using a marketing communication channel. A marketing communication channel may be any communication channel that is used to create a connection between an advertiser and target users.

In traditional marketing, a marketing communication channel may include a newspaper, radio, television, billboard, telephone, or door to door sale. In digital marketing, a marketing communication channel may include a website, blog, social media network, or search engine. An advertiser often selects a marketing communication channel for an advertising campaign based on where their target audience spends their time. This ensures that the advertising campaign reaches the relevant users.

In traditional marketing, an advertiser may create and execute an advertising campaign using a marketing channel that targets specific users. For example, an advertiser may target viewers watching a particular TV show on a particular TV station. Similarly, in digital marketing, an advertiser may create and execute an advertising campaign using a marketing channel that targets specific users. Digital marketing, however, improves upon traditional marketing by enabling an advertiser to target users more effectively.

In digital marketing, an advertiser may define what users to target based on one or more parameters. An advertiser may use these parameters to segment users based on demographic considerations, behavioral patterns, or geographic location. For example, in demographic segmentation, an advertiser may divide an audience based on parameters such as gender, age, income, place of residence, education, marital status, race, or household size. In behavioral segmentation, an advertiser may divide an audience based on specific consumption patterns. For example, an advertiser may divide an audience based on parameters such as past purchase history or browsing history. In geographic segmentation, an advertiser may divide an audience based geographic region. For example, an advertiser may divide an audience based on parameters such as zip code. An advertiser may divide an audience based on various other types of parameters such when users are active, how often users use a product, and whether users are previous visitors.

After defining what users to target for an advertising campaign, an advertiser may publish the advertising campaign to a digital marketing channel such as a website, blog, social media network, or search engine. For example, the advertiser may upload the creatives of the advertising campaign to a website, blog, social media network, or search engine. In some cases, the advertiser may control the digital marketing channel. In other words, the advertiser may be the publisher of the digital marketing channel. In some other cases, the digital marketing channel may be run by an outside publisher. In this later case, the advertiser may provide the publisher the parameters that define what users to target for the advertising campaign.

To implement targeting, the publisher may provide various ad placements on its website, blog, social media network, or search engine where the advertiser may publish creatives from its advertising campaign. An ad placement may be a specific group of areas on the website, blog, social media network, or search engine where the advertiser can choose to place ads from the advertising campaign for targeting purposes. In some cases, the advertiser may target an advertising campaign by merely selecting an ad placement having a certain location on the website, blog, social media network, or search engine. In some other cases, the advertiser may target an advertising campaign by selecting an ad placement that is configured by the publisher to display the advertising campaign based on whether the parameters of the advertising campaign match characteristics of a user, a user device, or content of the website, blog, social media network, or search engine.

1.3 Measuring Digital Advertisement Campaign Effectiveness

In addition to targeting users, advertisers also want to measure the effectiveness of a digital advertising campaign. There are various methods to measure how effective a digital advertising campaign is. Many of these methods are unavailable in traditional marketing. This is because traditional marketing and digital marketing use different communication models. For example, in traditional marketing, an advertising campaign may provide outbound marketing. In outbound marketing, an advertiser may share an advertising campaign with consumers, but consumers may not be able to communicate back with the advertiser. For example, if a potential consumer views an advertisement message on TV and later buys the product in-store, there may be no way for the advertiser to connect the purchase action back to the advertisement message.

In contrast, in digital marketing, an advertising campaign may provide inbound marketing. In inbound marketing, an advertiser may share an advertising campaign with consumers, and the consumers may communicate back with advertiser. For example, in digital marketing, if a potential consumer views an advertisement message on a website, or the consumer clicks the advertisement message to buy the product, the advertiser may be able to connect the action (e.g., view or click) back to the advertisement message. Thus, inbound marketing allows an advertiser to elicit an immediate consumer response to an advertising campaign. Because inbound marketing enables consumers to communicate back with advertisers, advertisers are able to collect various types of data from consumers in response to an advertising campaign. An advertiser can often use this data to evaluate the performance of an advertising campaign and pivot a marketing strategy when needed.

An advertiser may collect various types of data from consumers in response to an advertising campaign. For example, an advertiser may collect impressions which represent the number of times a creative was displayed to an individual consumer. An advertiser may collect clicks for a creative which represent the number of times a consumer clicked the creative. An advertiser may collect a click-through-rate for a creative. A click-through-rate may represent the percentage of impressions of the creative that were clicked. This may be calculated by dividing the number of clicks of the creative by the number of impressions of the creative. An advertiser may collect conversions for a creative. A conversion may represent one of a set of desired actions taken by a consumer after clicking a creative. For example, a conversion action may include making a purchase, filling out a form, subscribing to a service, or various other actions as would be appreciated by a person of ordinary skill in the art. Finally, an advertiser may collect a conversion rate for a creative. A conversion rate may represent the percentage of clicks of the creative that resulted in a desired action. This may be calculated by dividing the number of conversions of the creative by the number of clicks of the creative.

In addition, an advertiser may collect this data at various levels of interest to better evaluate the effectiveness of an advertising campaign. For example, an advertiser may collect data at the advertising campaign level. Data collected at the advertising campaign level may measure how well the advertising campaign is doing holistically, across all publishers, placements, and creatives. An advertiser may also collect data at the publisher level. Data collected at the publisher level may measure how well the campaign is doing across all ad placements at the publisher. Finally, an advertiser may collect data at the creative level. Data collected at the creative level may measure how well an individual creative is doing across all publishers and placements.

After collecting this data, an advertiser may use the data to determine more information about its customers, how effective its advertising campaign is, and how to change its advertising strategy going forward. An advertiser may determine this information by combining the collected data with the targeting information associated with the advertising campaign. For example, an advertiser may create and execute an advertising campaign that advertises a product for sale to users in the Washington, D.C. area. This advertising campaign may collect the percentage of people who click a creative in the advertising campaign and purchase the product. This conversion rate, coupled with the advertising campaign's targeting parameters, may therefore provide an indication of how popular the product is in the Washington, D.C. area.

An advertiser may also compare the performance of different advertising campaigns by conducting various types of experimental testing. For example, the advertiser may conduct A/B testing or bandit testing. A/B testing involves comparing two versions of something (A and B) in equal percentages (50/50), which are identical except for one variation that might affect a user's behavior. Version A might be the currently used version (control), while version B may be modified in some respect. In the case digital advertising, A/B testing may involve identifying changes to an advertising campaign that increase an outcome of interest (e.g., a click-through rate for an advertising campaign). For example, an advertiser may create two advertising campaigns that are identical except for one dimension. The advertiser may then setup the two advertising campaigns so that 50% of users receive the control advertising campaign and 50% of the users receive the variant advertising campaign. The advertiser may then run the two advertising campaigns for a period of time. After the period of time is over, the advertiser may determine whether the modification to the variant advertising campaign increased an outcome of interest (e.g., a click through rate).

The advertiser may also conduct bandit testing. In a bandit testing, three or more options are tested simultaneously, and more traffic (e.g., users) is diverted to the most successful option (e.g., the advertising campaign having the highest conversion rate) at a given point in time, while continuing to run and evaluate other options for a smaller percentage of the traffic. Bandit testing involves continuously shifting traffic in reaction to the real-time performance of the test. In other words, bandit testing can be adaptive unlike A/B testing.

1.4 Measuring Digital Advertising Effectiveness

As discussed above, an advertiser may publish an advertising campaign to a digital marketing channel such as a website, blog, social media network, or search engine. The type of data collected as part of this advertising campaign may be first party data. First party data may be data about the behaviors, actions, or interests of consumers which is collected by the advertiser or the publisher through a direct relationship with its consumers. For example, first party data can be collected directly at an advertiser's website. Because the data is collected directly at the advertiser's website, the advertiser can have full visibility into an individual customer (e.g., what he does, what he buys, etc.). Moreover, because this data is collected by either the advertiser or the publisher, there are two types of first party data: advertiser first-party data and publisher first-party data. Digital marketers often use first party data to learn valuable information about their customers and evaluate and change their advertising campaigns.

First party data may have several advantages compared to other types of data such as second party data and third party data. First, because first party data can be collected directly by an advertiser or publisher, it is often the highest quality and most valuable type of data. Second, first party data can often be collected at no cost to the advertiser or publisher because its captured at their own website. In contrast, digital marketer may have to buy second party data and third party data. Finally, because first-party data is collected directly by the advertiser or the publisher through a direct relationship with a consumer, there are fewer privacy concerns compared to the collection of second party data and third party data.

Despite these advantages of first party data, digital marketers are often interested in using second party data and third party to learn additional information about their customers and evaluate their advertising campaigns. For example, in some cases, digital marketers may learn additional information about their customers, and evaluate their advertising campaigns by combining first party data, second party data, and third party data.

Digital marketers often use third party data to measure the success of their digital advertising campaigns. Third party data may be data about the behaviors, actions, or interests of customers which is generated on other platforms and provided in aggregate form to the digital marketers. In other words, third-party data is information that is collected by an entity that doesn't have a direct relationship with the consumers. Various companies and organizations may sell third-party data to advertisers. An advertiser may use third party data to piece together detailed profiles about its customer's tastes and behaviors as they move around the web. But third party data is often not very helpful to an advertiser. This is because third party data is collected by an entity that doesn't have a direct relationship with the advertiser's consumers. As a result, third party data is often of a lower quality.

More recently, digital marketers have started relying on second party data to measure the success of digital advertising campaigns. Second party data may be first party data that a digital marketer gets directly from another source. For example, a digital marketer may make a deal with a retailer (e.g., Amazon.com® or Walmart®) to receive customer information collected directly at the retailer. In other words, second party data involves a situation in which a "first-party" gives data to another entity.

Second party data often provides several advantages to digital marketers compared to first party data and third party data. First, competitors of a digital marketer often do not have access to second party data. Second, a digital marketer can use second party data to form a larger, more complete picture of their customers. This is often because second party data gives a digital marketer access to audiences that the digital marketer was unable to reach.

But digital marketers often encounter challenges when working with second party data. First, digital marketers may receive incomplete second party data. Second, digital marketers may receive second party data in aggregate form without knowing how the second party data was aggregated. As a result, digital marketers may be unable to learn information about their customers, or determine the effectiveness of their advertising campaigns based on second party data.

By way of example, a digital marketer may create and execute an advertising campaign to collect data from a source. For example, a digital marketer may indicate that it is interested in knowing how many products were sold every week at the source. But the digital marketer may not know how the source aggregated the data—number of products sold every week to new customers, number of products sold every week to existing customers, or number of products sold every week to both new and existing customers. In other words, the digital marketer may have no control over how the source aggregates the data. Thus, because second party data is often incomplete or it is unclear how it was aggregated, a digital marketer may be unable to measure the effectiveness of an advertising campaign based on second party data. As a corollary, the digital marketer may be unable to effectively change their advertising strategy.

2. Example Operating Environment

FIG. 1 illustrates a functional block diagram 100 of an example operating environment in which embodiments of the present disclosure can be implemented. Block diagram 100 includes a first device 102, a second device 104, and a third device 106. First device 102, second device 104, and third device 106 can be configured to communicate with network 108. In various embodiments, the network 108 can include, without limitation, wired and/or wireless intranet, extranet, Internet, cellular, Bluetooth and/or any other local, short range, ad hoc, regional, global communications network, as well as any combination thereof.

First device 102 is a computer system (e.g., a standalone computer system, a server computer system, or cluster computer system). First device 102 may be controlled and configured by an advertiser. First device 102 includes measurement data 114 (e.g., impressions, clicks, click-through-rates, conversions, etc.). First device 102 collects measurement data 114 directly from its users. Thus, measurement data 114 may be first party data. Measurement data 114 may include data about the behaviors, actions, or interests of individual users of first device 102. For example, measurement data 114 may include data about the age, sex, ethnicity, or location of individual users of first device 102. Thus, measurement data 114 may be captured at a granular level. This is possible because measurement data 114 is captured directly at first device 102.

Second device 104 is a computer system (e.g., a standalone computer system, a server computer system, or cluster computer system). Second device 104 may be controlled and configured by an entity other than the advertiser controlling and configuring first device 102. For example, second device 104 may be controlled and configured by a retailer such as Amazon.com, Inc. or Walmart, Inc. Second device 104 includes measurement data 116 (e.g., impressions, clicks, click-through-rates, conversions, etc.). Second device 104 collects measurement data 116 directly from its users. Thus, from the perspective of second device 104, measurement data 116 is first party data. Measurement data 116 may include data about the behaviors, actions, or interests of individual users of second device 104. For example, measurement data 116 may include data about the age, sex, ethnicity, or location of individual users of second device 104. Thus, measurement data 116 may be captured at a granular level. This is possible because measurement data 116 is captured directly at second device 102.

In some embodiments, first device 102 may have a data exchange agreement with second device 104. First device 102 may be configured to receive measurement data 116 from second device 104. Thus, from the perspective of first device 102, measurement data 116 is second party data. But first device 102 may not receive measurement data 116 in its raw form. For example, first device 102 may receive measurement data 116 without information about the age, sex, ethnicity, or location of individual users of second device 104. Instead, first device 102 may receive measurement data 116 from second device 104 in aggregate form.

Third device 106 is a computer system (e.g., a standalone computer system, a server computer system, or cluster computer system). Third device 106 may be controlled and configured by an entity different than the entities controlling and configuring first device 102 and second device 104. For example, third device 106 may be controlled and configured by a data aggregator such Acxiom Inc.

Third device 106 includes measurement data 118 (e.g., impressions, clicks, click-through-rates, conversions, etc.). Measurement data 118 may include measurement data that third device 106 aggregated together from third party data source 110 and third party data source 112. Third party data source 110 and third party data source 112 may be websites, search engines, social media networks, or other data sources as would be appreciated by a person of ordinary skill in the art. Measurement data 118 may therefore include generalized data about the behaviors, actions, or interests of users across third party data source 110 and third party data source 112. In other words, measurement data 118 may be capture data at a broad level instead of at the individual user level.

In some embodiments, first device 102 may have a data exchange agreement with third device 104. First device 102 may be configured to receive measurement data 118 from third device 104. Thus, from the perspective of first device 102, measurement data 118 is third party data.

Similarly, in some embodiments, second device 104 may have a data exchange agreement with third device 104. Second device 104 may be configured to receive measurement data 118 from third device 104. Thus, from the perspective of second device 104, measurement data 118 is also third party data.

As discussed above, first device 102 may have a data exchange agreement with second device 104. First device 102 may be configured to receive measurement data 116 from second device 104. An advertiser at first device 102 may define the type of measurement data 116 to receive from second device 104 by creating and executing an advertising campaign at second device 104. For example, the advertiser may create an advertising campaign that collects measurement data (e.g., impressions, clicks, click-through-rates, conversions, etc.) for targeted users. The advertiser may define what users to target based on one or more parameters. The advertiser may use these parameters to segment users based on demographic considerations, behavioral patterns, or geographic location. The advertiser may further define what measurement data to collect. For example, the advertiser may create an advertising campaign that collects impressions, clicks, a click-through rate, conversions, or a conversion rate for the targeted users. The advertiser may evaluate the performance of the advertising campaign based on the resulting measurement data 116.

But often the advertiser at first device 102 receives measurement data 116 that does not provide a way for the advertiser to effectively target advertising campaigns in the future. This is because measurement data 116 is often incomplete, or because the advertiser at first device 102 is not privy to how second device 104 aggregated measurement data 116.

For example, an advertiser at first device 102 may create and execute an advertising campaign at second device 104 that collects the number of people who bought a product at second device 104 after seeing the advertising campaign. In response, first device 120 receives measurement data 116 corresponding to this advertising campaign. But the resulting measurement data may not include information about whether the purchasers were men or women, young or old, or new or existing customers. This missing information may enable the advertiser to learn new things about its users. For example, the advertiser may want to learn how many people from the Washington, D.C. area purchased the product at second device 104 after seeing the advertising campaign. In addition, this missing information may enable the advertiser to more effectively target their advertising in the future. For example, the advertiser may want to spend more money on an advertising campaign that focuses on purchasers who are new customers rather than an advertising campaign that focuses on purchasers who are existing customers.

In addition, an advertiser may want to configure first device 104 to automatically modify an advertising campaign based on its performance in view of missing information. For example, the advertiser may want to configure first device 104 to automatically compare the conversion rate performance of an advertising campaign depending whether the purchasers are from the United States or Europe. The advertiser may further want to configure first device 104 to automatically retarget the advertising campaign to United States or European users based on whether there is a higher conversion rate for purchasers from the United States or Europe.

In addition to missing information, an advertiser at first device 102 may not be privy to how second device 104 aggregates measurement data 116. This may reduce the advertiser's ability to compare measurement data 116 to other first party data, second party data, or third party data. For example, the advertiser at first device 102 may create and execute an advertising campaign at second device 104 that collects the number of people who bought a product at second device 104 (e.g., Amazon.com) after seeing the advertising campaign. The advertiser at first device 102 may also execute the same advertising campaign at another device (e.g., Walmart.com) that provides second party measurement data. The advertiser may want to reliably compare the performance of the advertising campaign at both second device 104 and the other device. But this may not be possible because measurement data 116 from second device 106 may be aggregated differently than measurement data from the other device. Similarly, the advertiser at first device 102 may want to combine measurement data 116 with other first party data, second party data, or third party data. But this may not be possible because measurement data 116 may be aggregated differently than the other first party data, second party data, or third party data.

3. System and Method for Analyzing Second Party Measurement Data

Figure 2:
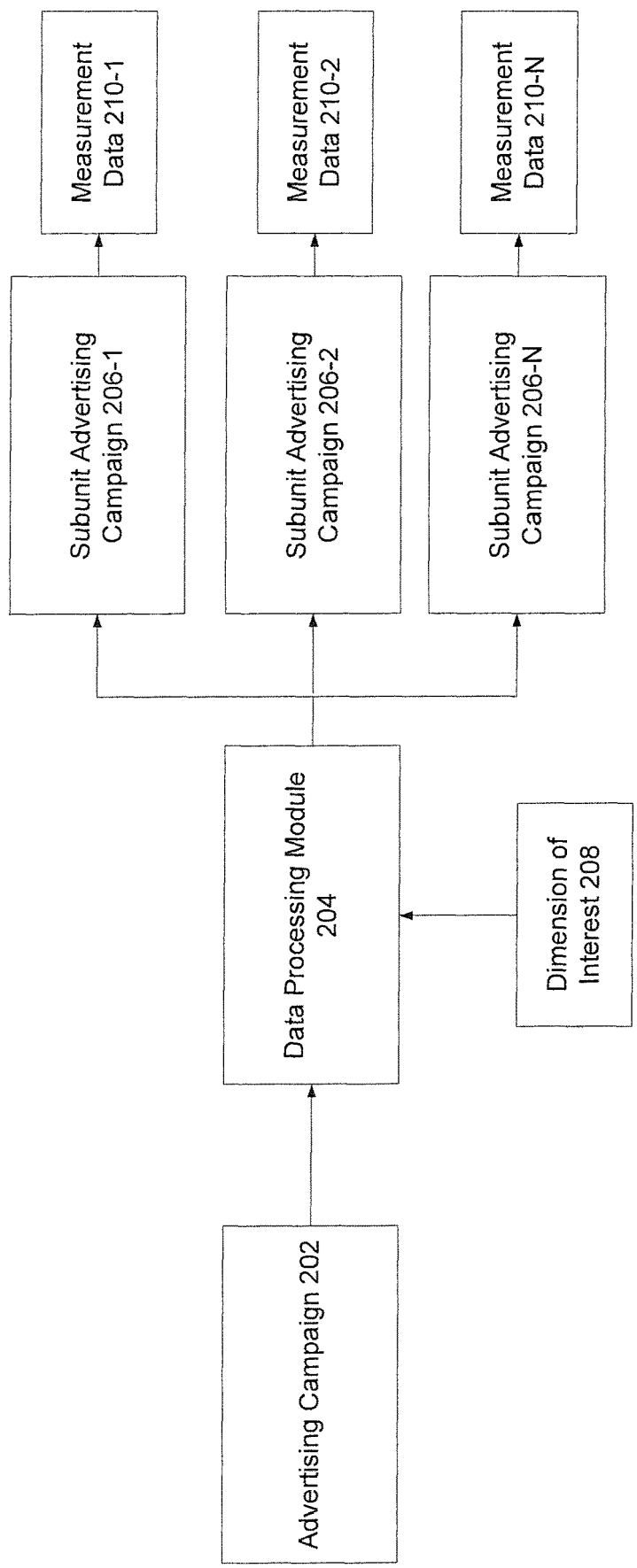
FIG. 2 is a block diagram of a system for analyzing second party measurement data, according to an example embodiment.

FIG. 2 is a block diagram of a system 200 for analyzing second party measurement data, according to an example embodiment. System 200 solves the technological problem of: how to generate and execute an advertising campaign that approximates first party data for the digital platform when the actual first party data is unavailable or inaccessible from the digital platform. System 200 solves this technological problem by: dynamically creating and executing subunit advertising campaigns based on an advertising campaign and a dimension of interest on the digital platform. The creation of subunit advertising campaigns can enable second party data to be combined with other data (e.g., other second party data or third party data) to approximate first party on a digital platform that a digital marketer does not have access to. Moreover, the creation of subunit advertising campaigns can enable a digital marketer to combine second party data with other data (e.g., other second party data or third party data) even if the second party data is aggregated differently than other data. Finally, the creation of subunit advertising campaigns can reduce the computational and memory costs associated with the direct capture of first party data. FIG. 2 is discussed with reference to FIG. 1, although this disclosure is not limited to that example embodiment.

In the example of FIG. 2, data processing module 204 receives advertising campaign 202 and dimension of interest 208. In response, data processing module 204 generates subunit advertising campaigns 206 based on advertising campaign 202 and dimension of interest 208.

In some embodiments, advertising campaign 202 may be an advertising campaign defined by an advertiser at first device 102. The advertiser may create advertising campaign 202 that targets users based on one or more parameters. The advertiser may use these parameters to segment users based on demographic considerations, behavioral patterns, or geographic location. Advertising campaign 202 may be executed at a source such as second device 104 (e.g., Amazon.com or Walmart.com). In response, second device 104 may generate measurement data 116 for advertising campaign 202. First device 102 may receive this measurement data 116.

For example, an advertiser at first device 102 may create advertising campaign 202 to collect the number of people who bought a product at second device 104 last week after seeing advertising campaign 202. In response to executing advertising campaign 202 at second device 104, first device 120 may receive measurement data 116 corresponding to advertising campaign 202.

But this measurement data 116 may be incomplete. For example, the advertiser at first device 102 may want to collect the number of people in a geographic region who bought a product at second device 104 after seeing advertising campaign 202. But the measurement data 116 corresponding to advertising campaign 202 may not have this information.

In some embodiments, data processing module 204 may solve this missing data problem. First, data processing module 204 may determine a set of dimensions that the source (e.g., second device 104) uses to aggregate measurement data 116 for advertising campaign 202. For example, data processing module 204 may determine that the set of dimensions that second device 104 uses to aggregate measurement data 116 includes product and week. As would be appreciated by a person of ordinary skill, data processing module 204 may determine the set of dimensions using a web service, configuration file, or other mechanism as would be appreciated by a person of ordinary skill in the art.

In some embodiments, after determining the set of dimensions, data processing module 204 may receive a dimension of interest 208. An advertiser at first device 102 may input dimension of interest 208 to data processing module 204. Dimension of interest 208 may be any dimension of data that is missing from measured data 116. Dimension of interest 208 may be a call to action, demographic characteristic, geographic region, or other type of dimension as would be appreciated in the art. Dimension of interest 208 may be selected from second party data or third party data. For example, dimension of interest 208 may be a zip code and the set of zip code values may be stored in second party data or third party data.

In some embodiments, after receiving dimension of interest 208, data processing module 204 may generate subunit advertising campaigns 206 based on advertising campaign 202, the determined set of dimensions, and dimension of interest 208. For example, data processing module 204 may generate subunit advertising campaigns 206 that are equivalent to advertising campaign 202 but modified by dimension of interest 108. Data processing module 204 may generate an individual subunit advertising campaign 206 for each value in a range of values for dimension of interest 208. In some other embodiments, data processing module 204 may generate an individual subunit advertising campaign 206 for each value in a defined set of values for dimension of interest 208. In some embodiments, an advertiser at first device 104 may define the set of values available for dimension of interest 208.

For example, where advertising campaign 202 collects the number of people who bought a product at second device 104 last week and dimension of interest 208 is zip code, data processing module 204 may generate subunit advertising campaigns 206 for each zip code value. For example, for a zip code value of 20001, data processing module 204 may generate a subunit advertising campaign 206 that collects the number of people in the 20001 zip code who bought a product at second device 104 last week.

In some embodiments, after data processing module 204 generates subunit advertising campaigns 206, the subunit advertising campaigns 206 may be simultaneously executed at a source (e.g., second device 104). In response, the source may generate measurement data 210 for each subunit advertising campaign 206. The source may transmit the measurement data 210 for each subunit advertising campaign 206 to a device such as first device 102 for further analysis. Thus, from the perspective of first device 104, the measurement data 210 for each subunit advertising campaign 206 represents second party data. The measurement data 210 for each subunit advertising campaign 206 represents a portion of the entire measurement data 116 for advertising campaign 202. For example, the measurement data 210 for each subunit advertising campaign 206 may include the number of people in a given zip code who bought a product at second device 104 last week rather than the total number of people who bought a product at second device 104 last week.

In some embodiments, data processing module 204 may be configured to generate sub-subunit advertising campaigns based on a subunit advertising campaign 210, a determined set of dimensions of the subunit advertising campaign 210, and another dimension of interest. The sub-subunit advertising campaigns may be simultaneously executed at a source such as second device 104. In response, the source may generate measurement data for each sub-subunit advertising campaign. As would be appreciated by a person of ordinary skill in the art, data processing module 204 may be configured to generate sub-subunit advertising campaigns using a recursive algorithm.

Figure 3:
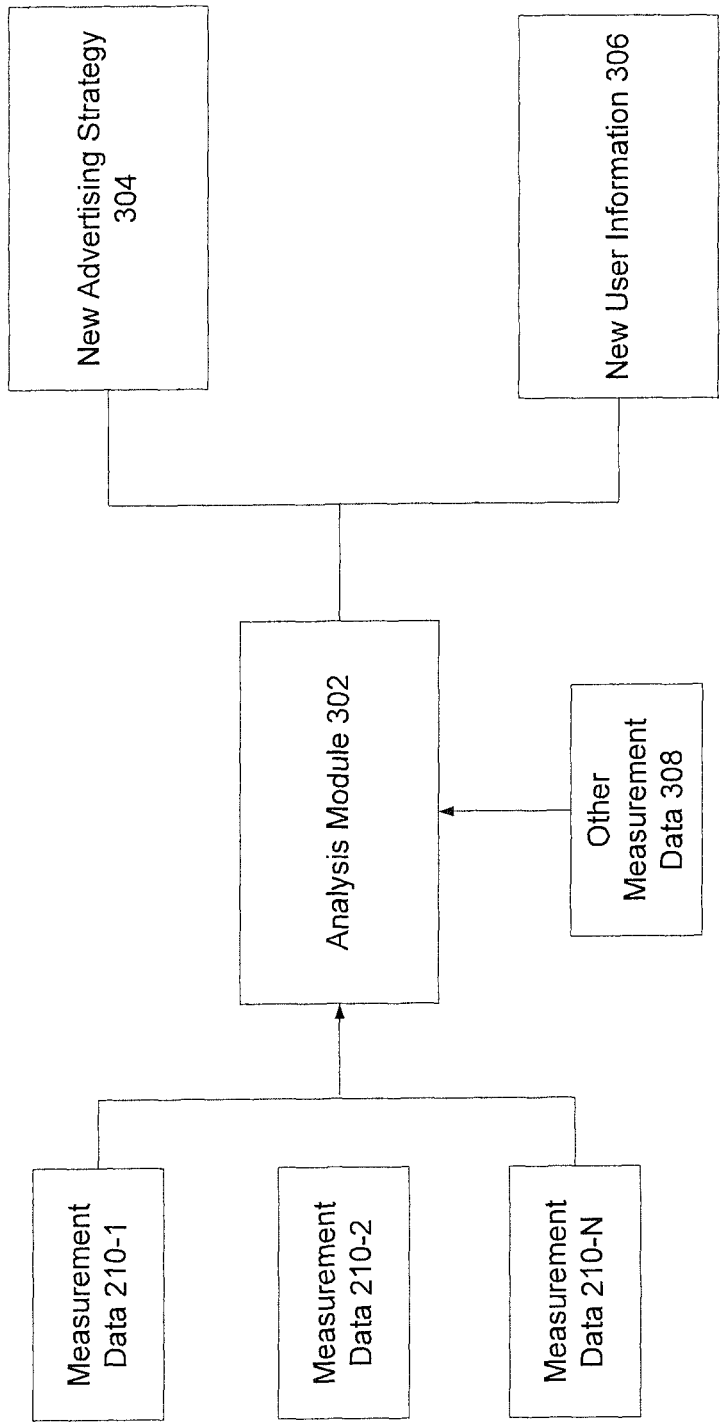
FIG. 3 is a block diagram of a system for processing second party measurement data from subunit advertising campaigns, according to an example embodiment.

FIG. 3 is a block diagram of a system for processing measurement data from subunit advertising campaigns, according to an example embodiment. FIG. 3 is discussed with reference to FIGS. 1 and 2, although this disclosure is not limited to those example embodiments.

In the example of FIG. 3, analysis module 302 receives measurement data 210 for each subunit advertising campaign 206. In some embodiments, analysis module may receive other measurement data 308 (e.g., other first party measurement data, second party measurement data, or third party measurement data). In response, analysis module 302 may outputs a new advertising strategy 304 and or new user information 306.

In some embodiments, analysis module 302 may analyze measurement data 210 for a subunit advertising campaign 206 to learn new user information. For example, an advertiser at first device 104 may want to determine how many people from the Washington, D.C. area purchased a product at second device 104 last week as opposed to how many people generally purchased the product at second device 104 last week. Analysis module 302 may be configured to output this new user information 306 based on an analysis of measurement data 210 for a subunit advertising campaign 206.

In some embodiments, analysis module 302 may compare the performance of different subunit advertising campaigns 206 based on their associated measurement data 210. For example, analysis module 302 may be configured to determine whether a subunit advertising campaign 206 that collects how many new customers purchased a product at second device 104 last week has a higher purchase conversion rate than a subunit advertising campaign 206 that collects how many existing customers purchased the product at second device 104 last week. In some embodiments, analysis module 302 may further compare the performance of different subunit advertising campaigns 206 using various types of experimental testing. For example, analysis module 302 may conduct AB testing or bandit testing of the different subunit advertising campaigns 206. Analysis module 302 may be configured to output a new advertising strategy (e.g., new advertising strategy 304) based on the comparison. For example, analysis module 302 may output a new advertising strategy 304 that indicates that a particular subunit advertising campaign 206 should be selected over another subunit advertising campaign 206. In some embodiments, analysis module 302 may automatically select and execute a new or modified advertising campaign based on new advertising strategy 304.

In some embodiments, analysis module 302 may combine measurement data 210 for one or more subunit advertising campaigns 206 with other measurement data 308. In some embodiments, other measurement data 308 may include first party data, second party data, or third party data. In some embodiments, analysis module 302 may determine the differences in dimensions between the measurement data 210 for the one or more subunit advertising campaigns 206 and other measurement data 308. If analysis module 302 determines there is a difference in dimensions, data processing module 204 may be used to cure this difference by creating new advertising campaigns based on the one or more subunit advertising campaigns 206 and a missing dimension of interest. In some other embodiments, analysis module 302 may combine the measurement data 210 for the one or more subunit advertising campaigns 206 with other measurement data 308 based on their shared dimensions. Analysis module 302 may be configured to output new user information 306 based an analysis of the combined measurement data. In some other embodiments, analysis module 302 may be configured to output new advertising strategy 304 based on an analysis of the combined measurement data.

Figure 4:
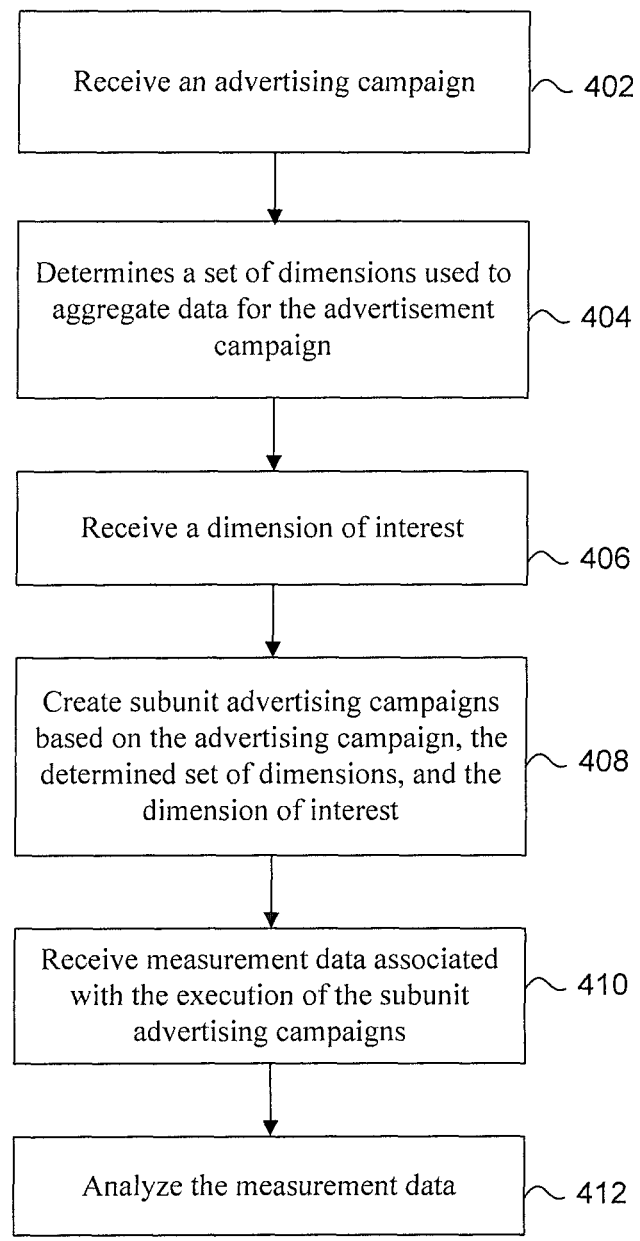
FIG. 4 is a flowchart for a process for analyzing an advertising campaign, according to an example embodiment.

FIG. 4 is a flowchart for a method 400 for analyzing an advertising campaign, according to an embodiment. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1, 2, and 3. However, method 400 is not limited to these example embodiments.

In 402, data processing system 204 receives an advertising campaign 202. Advertising campaign 202 may be capable of execution on a source (e.g., second device 104) which generates second party measurement data corresponding to advertising campaign 202.

In 404, data processing system 204 determines a set of dimensions that the source (e.g., second device 104) uses to aggregate data for advertising campaign 202. In some embodiments, data processing module 204 may determine the set of dimensions using a web service, configuration file, or other mechanism as would be appreciated by a person of ordinary skill in the art.

In 406, data processing system 204 receives a dimension of interest 208. The dimension of interest 208 may be absent from the determined set of dimensions. In some embodiments, an advertiser may define the dimension of interest 208. In some embodiments, dimension of interest 208 may be selected from second party data or third party data. For example, dimension of interest 208 may be a zip code and the set of zip code values may be stored in second party data or third party data.

In 408, data processing system 204 creates subunit advertising campaigns 206 based on advertising campaign 202, the determined set of dimensions, and the dimension of interest 208. In some embodiments, data processing system 204 may create a subunit advertising campaign 206 for each value in a range of values of the dimension of interest 208. For example, data processing system 204 may create a subunit advertising campaign 206 for each zip code value in the range of available zip code values.

In 410, analysis module 302 receives measurement data 210 associated with the execution of each subunit advertising campaign 206. The received measurement data 210 may approximate first party data. In other words, the combination of a dimension of interest 208 from second party data or third party data with existing second party data that is returned in response to running advertising campaign 202 on the source (e.g., second device 104), may approximate the first party that the source collects directly for advertising campaign 202.

In 412, analysis module 302 analyzes the measurement data 210 associated with each subunit advertising campaign 206 to output new user information 306 or a new advertising strategy 304. In some embodiments, analysis module 302 analyzes the measurement data 210 by combining it with other measurement data such as first party data, second party data, or third party data. In some embodiments, analysis module 302 analyzes the measurement data 210 using machine learning techniques. In some embodiments, analysis module 302 analyzes the measurement data 210 in connection with conducting experimental testing of the different subunit advertising campaigns 206.

4. Example Computer System Implementation

Figure 5:
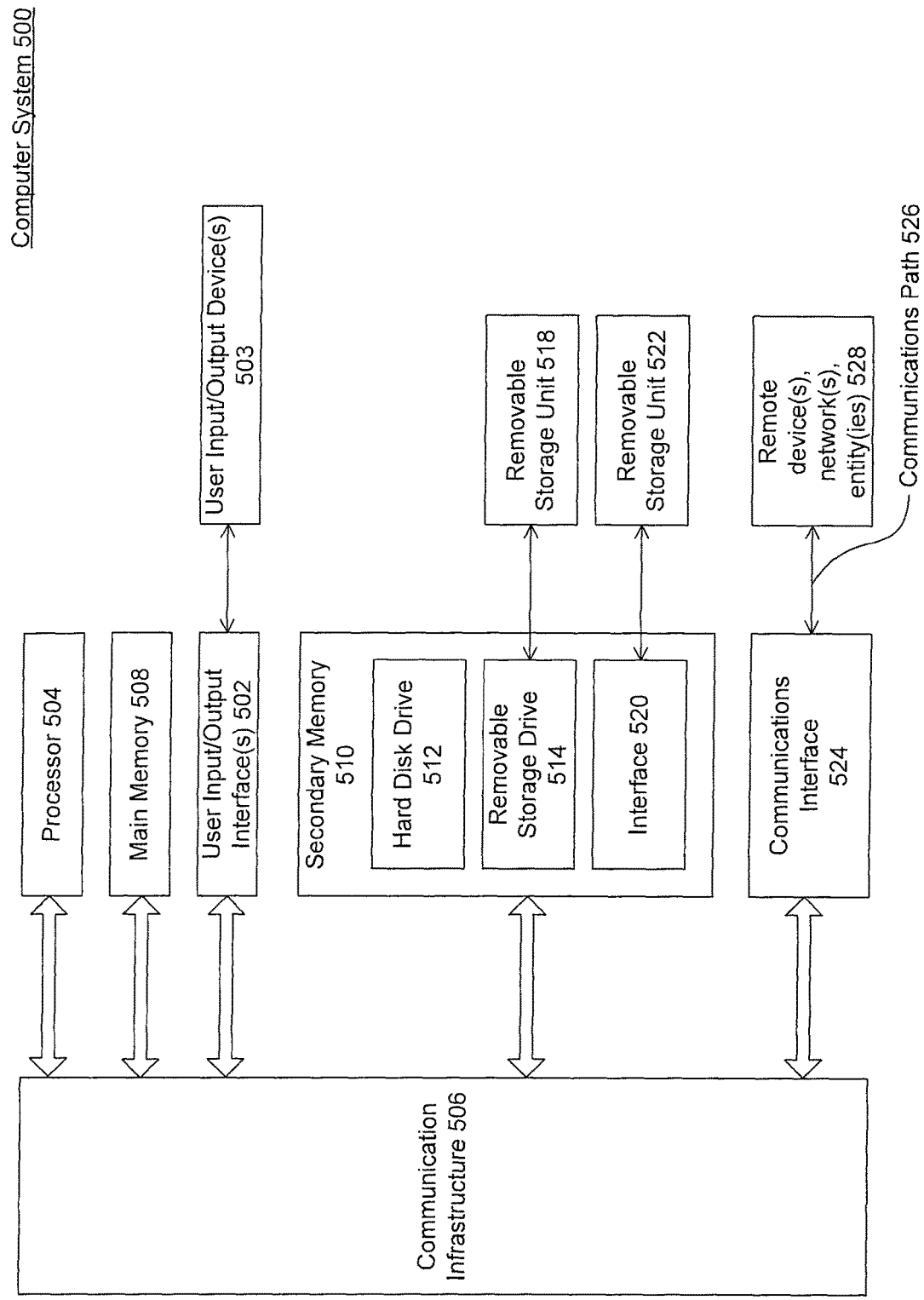
FIG. 5 is an example computer system useful for implementing various embodiments.

Various embodiments can be implemented, for example, using one or more computer systems, such as computer system 500 shown in FIG. 5. Computer system 500 can be used, for example, to implement method 400 of FIG. 4. For example, computer system 500 can determine a resource block allocation of a portion of a tone space using a lookup table. Computer system 500 can further map a plurality of tones to a resource block based on the determined resource block allocation, according to some embodiments. Computer system 500 can be any computer capable of performing the functions described herein.

Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518.

Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for obtaining standardized first party measurement data for an advertising campaign executing at a remote device, comprising:

receiving, by at least one processor, the advertising campaign, wherein execution of the advertising campaign by the remote device obtains non-standardized second party data;

querying, by the at least one processor over a computer network, the remote device to determine a set of dimensions that the remote device uses to aggregate measurement data for the advertisement campaign using a configuration file stored at the remote device or a web service of the remote device;

defining, by the at least one processor, a dimension of interest;

determining, by the at least one processor, that the defined dimension of interest is absent from the set of dimensions that the remote device uses to aggregate measurement data for the advertisement campaign;

storing, by the at least one processor, the advertising campaign and the defined dimension of interest in a memory;

splitting, by the at least one processor, the advertising campaign into a plurality of subunit advertising campaigns using the defined dimension of interest, wherein each subunit advertising campaign in the plurality of subunit advertising campaigns comprises a respective value in a range of values defined by the defined dimension of interest, and each subunit advertising campaign in the plurality of subunit advertising campaigns comprises the set of dimensions that the remote device uses to aggregate measurement data for the advertisement campaign;

in response to the splitting, transmitting, by the at least one processor over the computer network, each subunit advertising campaign to the remote device for simultaneous execution by the remote device;

receiving, by the at least one processor over the computer network, the standardized first party measurement data from the remote device in real time in response to the transmitting, wherein the standardized first party measurement data approximates first party measurement data for the advertising campaign executing on the remote device, and the first party measurement data for the advertising campaign on the remote device is inaccessible to the at least one processor; and executing, by the at least one processor, a second advertising campaign based at least in part on the standardized first party measurement data from the remote device.

2. The method of claim 1, further comprising:
defining, by the at least one processor, the dimension of interest based at least in part on a second dimension of interest, wherein the second dimension of interest is representative of the dimension of interest.

3. The method of claim 1, wherein the dimension of interest represents a demographic characteristic, behavioral pattern, or geographic region.

4. The method of claim 1, further comprising:
processing, by the at least one processor, the standardized first party measurement data based on other first party measurement data, second party measurement data, or third party measurement data.

5. The method of claim 1, further comprising:
analyzing, by the at least one processor, the standardized first party measurement data.

6. The method of claim 1, further comprising:
creating, by the at least one processor, a respective second subunit advertising campaign for each value in a range of values for a second dimension of interest based at least in part on the advertising campaign, wherein the second dimension of interest is present in the set of dimensions of the advertising campaign.

7. The method of claim 6, further comprising:
second transmitting, by the at least one processor, each second subunit advertising campaign to a second remote device for execution by the second remote device;

second receiving, by the at least one processor, second standardized first party measurement data from the second remote device based at least in part on the second transmitting; and processing, by the at least one processor, the second standardized first party measurement data based at least in part on the standardized first party measurement data.

8. A system for obtaining standardized first party measurement data for an advertising campaign executing at a remote device, comprising:
a memory; and
at least one processor coupled to the memory and configured to:
receive an advertising campaign, wherein execution of the advertising campaign by the remote device obtains non-standardized second party data;
query, over a computer network, a set of dimensions that the remote device uses to aggregate measurement data for the advertisement campaign using a configuration file stored at the remote device or a web service of the remote device;
define a dimension of interest;
determine that the defined dimension of interest is absent from the set of dimensions that the remote device uses to aggregate measurement data for the advertisement campaign;
store the advertising campaign and the defined dimension of interest in the memory;
split the advertising campaign into a plurality of subunit advertising campaigns using the defined dimension of interest, wherein each subunit advertising campaign in the plurality of subunit advertising campaigns comprises a respective value in a range of values defined by the defined dimension of interest, and each subunit advertising campaign in the plurality of subunit advertising campaigns comprises the set of dimensions that the remote device uses to aggregate measurement data for the advertisement campaign;
in response to the splitting, transmit, over the computer network, each subunit advertising campaign to the remote device for simultaneous execution by the remote device;
receive, over the computer network, the standardized first party measurement data from the remote device in real time in response to the transmission of each subunit advertising campaign to the remote device for execution by the remote device, wherein the standardized first party measurement data approximates first party measurement data for the advertising campaign executing on the remote device, and the first party measurement data for the advertising campaign on the remote device is inaccessible to the at least one processor; and
execute a second advertising campaign based at least in part on the standardized first party measurement data from the remote device.

9. The system of claim 8, the at least one processor further configured to:
define the dimension of interest based at least in part on a second dimension of interest, wherein the second dimension of interest is representative of the dimension of interest.

10. The system of claim 8, the at least one processor further configured to:
analyze the standardized first party measurement data.

11. The system of claim 8, the at least one processor further configured to:
create a respective second subunit advertising campaign for each value in a range of values for a second dimension of interest based at least in part on the advertising campaign, wherein the second dimension of interest is present in the set of dimensions of the advertising campaign;

second transmit each second subunit advertising campaign to a second remote device for execution by the second remote device;

second receive second standardized first party measurement data from the second remote device based at least in part on the second transmission of each second subunit advertising campaign to the second remote device for execution by the second remote device; and process the second standardized first party measurement data based at least in part on the standardized first party measurement data.

12. A non-transitory computer-readable medium having instructions stored thereon that, when executed by at least one computing device, cause the at least one computing device to perform operations comprising:

receiving an advertising campaign, wherein execution of the advertising campaign by a remote device obtains non-standardized second party data;

querying, over a computer network, a set of dimensions that the remote device uses to aggregate measurement data for the advertisement campaign using a configuration file stored at the remote device or a web service of the remote device;

defining a dimension of interest;

determining that the defined dimension of interest is absent from the set of dimensions that the remote device uses to aggregate measurement data for the advertisement campaign;

storing the advertising campaign and the defined dimension of interest in a memory;

splitting the advertising campaign into a plurality of subunit advertising campaigns using the defined dimension of interest, wherein each subunit advertising campaign in the plurality of subunit advertising campaigns comprises a respective value in a range of values defined by the defined dimension of interest, and each subunit advertising campaign in the plurality of subunit advertising campaigns comprises the set of dimensions that the remote device uses to aggregate measurement data for the advertisement campaign;

in response to the splitting, transmitting, over the computer network, each subunit advertising campaign to the remote device for simultaneous execution by the remote device;

receiving, over the computer network, standardized first party measurement data from the remote device in response to the transmitting, wherein the standardized first party measurement data approximates first party measurement data for the advertising campaign executing on the remote device, and the first party measurement data for the advertising campaign on the remote device is inaccessible to the at least one computing device; and executing a second advertising campaign based at least in part on the standardized first party measurement data from the remote device.

13. The non-transitory computer-readable medium of claim 12, the operations further comprising:

defining the dimension of interest based at least in part on a second dimension of interest, wherein the second dimension of interest is representative of the dimension of interest.

14. The non-transitory computer-readable medium of claim 12, the operations further comprising:

analyzing the standardized first party measurement data.

15. The non-transitory computer-readable medium device of claim 12, the operations further comprising:

creating a respective second subunit advertising campaign for each value in a range of values for a second dimension of interest based at least in part on the advertising campaign, wherein the second dimension of interest is present in the set of dimensions of the advertising campaign.

16. The non-transitory computer-readable medium device of claim 15, the operations further comprising:

second transmitting each second subunit advertising campaign to a second remote device for execution by the second remote device;

second receiving second standardized first party measurement data from the second remote device based at least in part on the second transmitting; and processing the second standardized first party measurement data based at least in part on the standardized first party measurement data.

17. The method of claim 1, wherein the executing further comprises:

generating, by the at least one processor, the second advertising campaign in response to analyzing the standardized first party measurement data.

18. The method of claim 17, wherein the executing further comprises:

transmitting, by the at least one processor, the second advertising campaign to the remote device for execution by the remote device.

\* \* \* \* \*